United States Patent
Slipiec et al.

[11] 3,967,131
[45] June 29, 1976

[54] CORONA DISCHARGE OZONE GENERATING UNIT

[75] Inventors: Romuald E. Slipiec, Northbrook; Ronald A. Schultz, Berkeley, both of Ill.

[73] Assignee: Ozone Incorporated, Deerfield, Ill.

[22] Filed: June 4, 1974

[21] Appl. No.: 476,333

[52] U.S. Cl. .............................................. 250/539
[51] Int. Cl.² ........................................... C01B 13/11
[58] Field of Search ........................... 250/532–541

[56] References Cited
UNITED STATES PATENTS

| | | | |
|---|---|---|---|
| 927,519 | 7/1909 | Friedlander | 250/539 |
| 1,074,462 | 9/1913 | Richards | 250/539 |
| 1,136,227 | 4/1915 | Goldberg | 250/539 |
| 1,358,443 | 11/1920 | Held | 250/539 |
| 1,437,760 | 12/1922 | Kuhlenschmidt | 250/539 X |
| 1,531,196 | 3/1925 | Kuhlenschmidt | 250/539 |
| 2,128,455 | 8/1938 | Darling | 250/532 |
| 2,537,530 | 1/1951 | Hofman | 250/539 |
| 2,643,224 | 6/1953 | Niccoli | 250/540 |
| 2,658,868 | 11/1953 | Collison | 250/539 |
| 2,906,686 | 9/1959 | Trub | 250/536 |
| 3,766,051 | 10/1973 | Bollyky | 250/540 |

FOREIGN PATENTS OR APPLICATIONS

| | | | |
|---|---|---|---|
| 1,156 | 9/1913 | United Kingdom | 250/532 |

*Primary Examiner*—John H. Mack
*Assistant Examiner*—Aaron Weisstuch
*Attorney, Agent, or Firm*—Wallenstein, Spangenberg, Hattis & Strampel

[57] ABSTRACT

An ozone generating unit comprises a number of dielectric tube and electrode assemblies bundled together in confronting contacting relationship, each dielectric tube and electrode assembly preferably comprising a number of concentrically related and spaced dielectric tubes. The ends of the dielectric tubes into which gas is to be ozonized is to flow terminate at different points located progressively axially inwardly thereof proceeding from the outermost to the innermost dielectric tube. An outer cylindrical conductive electrode is rigidly frictionally fitted over the outermost of the dielectric tubes. Supported on the inner surface of each dielectric tube is an inner cylindrical electrode made of a sheet of resilient flexible conductive mesh material initially deformed into a given curvature different from that of the cylindrical inner surface of the associated dielectric tube so that the inner cylindrical electrode expands into contact with the cylindrical inner surface of the associated dielectric tube. The dielectric tubes are spaced apart at each end of the dielectric tube assembly by circumferentially spaced pieces of flexible resilient plastic tubing sandwiched between the dielectric tubes.

11 Claims, 13 Drawing Figures

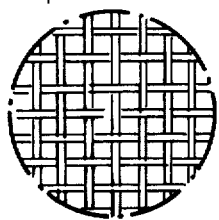
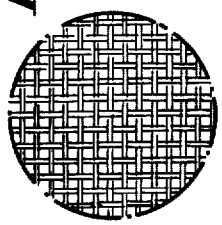
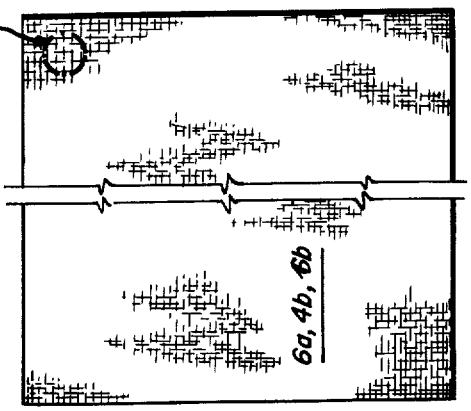
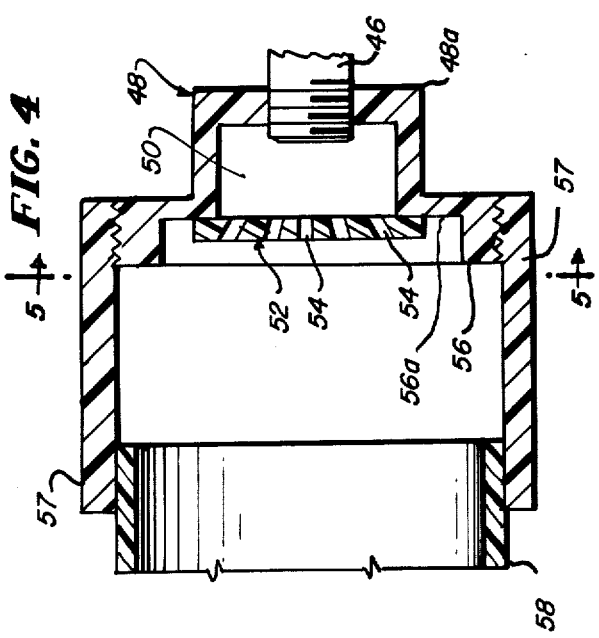
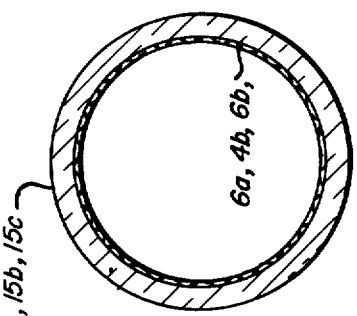
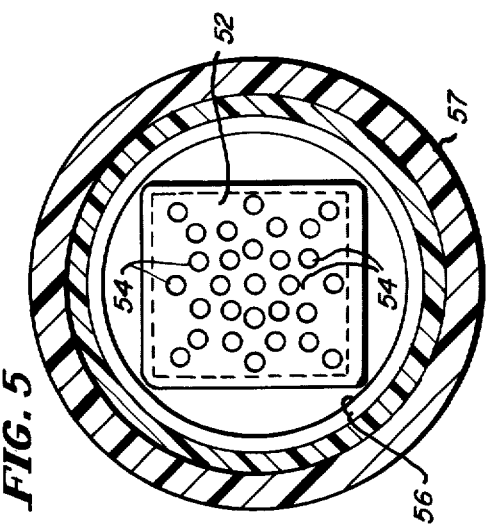
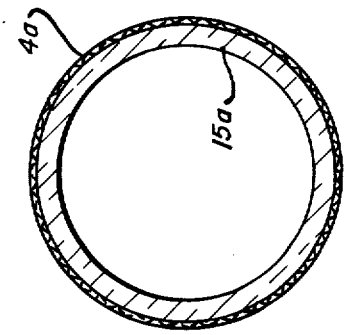

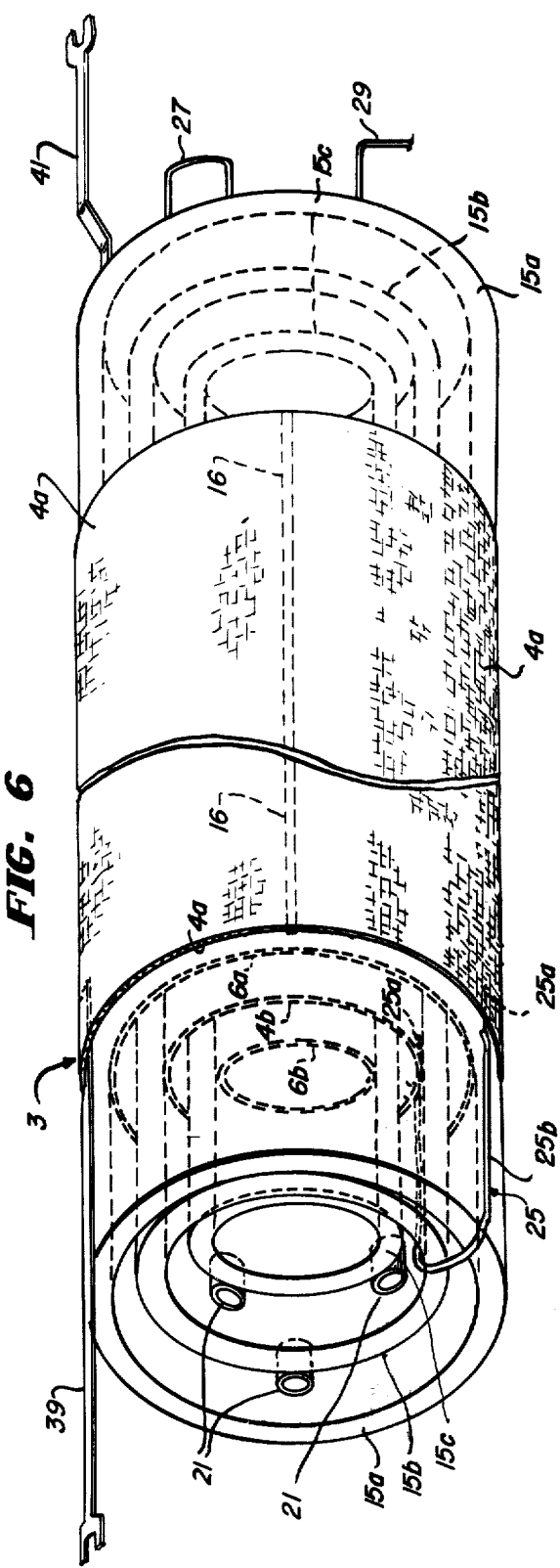
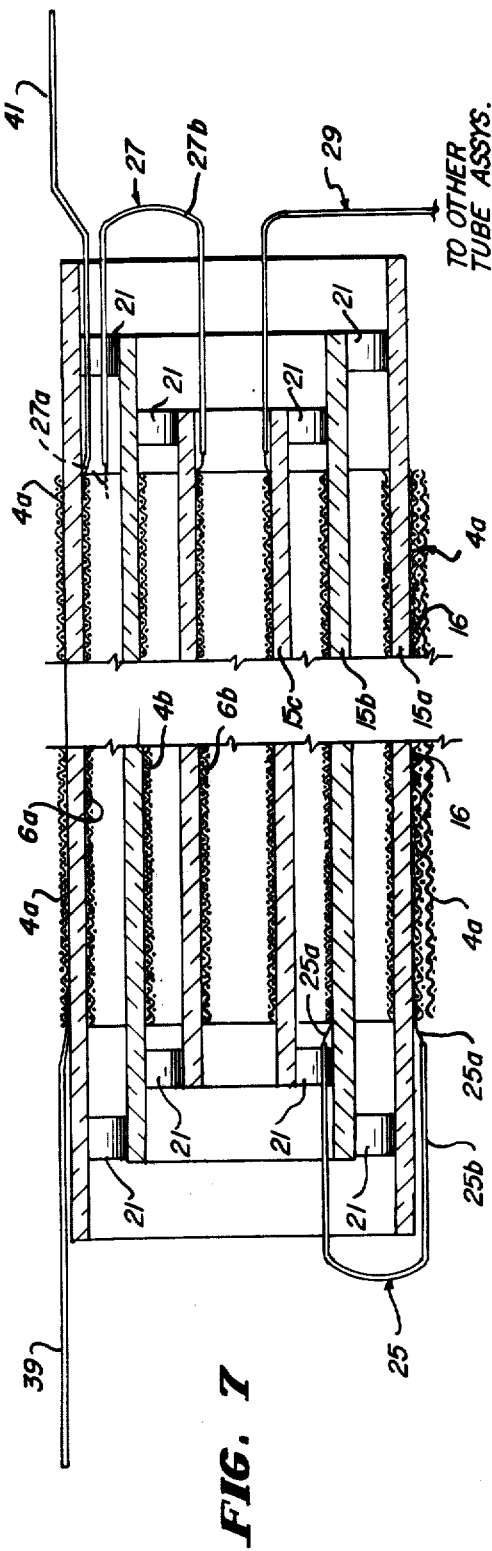
FIG. 6
FIG. 7

CORONA DISCHARGE OZONE GENERATING UNIT

BACKGROUND OF THE INVENTION

This invention relates to ozone generating equipment wherein ozone is produced by passing oxygen or a mixture of gases containing oxygen, such as air, through the corona existing between pairs of electrodes which are separated by an air gap and a dielectric shield and which are connected to a high AC voltage. This corona evolves heat, only a fraction of which (about 34 kilocalories per gram mol) is required for the formation of ozone. If the excess heat is not dissipated, the temperature of the effluent gases, the electrodes, dielectric shield and housing is elevated. This leads to decomposition of a portion of the ozone which at approximately 100°C breaks down almost as soon as it is formed. The higher the temperature the more rapidly does the ozone decompose. The heat may also cause the resistive properties of the dielectric shields utilized to change so that they perforate, causing short circuits within the electrode array.

In the past, a portion of the heat produced by the ozonation process was dissipated by enlarging the electrode surface area in respect to the length of the corona filled air gap. This creates problems of warping with resulting short circuits. Others have sought to cool the electrodes by passing a refrigerant such as water or brine through and/or over them. Aqueous refrigerants cannot be used within the corona area so are confined to use within the electrode structure. This calls for enlarging the physical size of the cooled electrode and requires that one side of the electrical circuit be grounded, thereby preventing the use of center tap grounded transformer windings to reduce the magnitude of the voltages with respect to ground present in the equipment involved.

The dielectric shield generally used between the electrodes of an ozone generating unit is made of a glass or similar material which can be readily cracked or punctured when excessive stresses are applied thereto by hot spots or wide variations in temperature of the air moving over different portions thereof. Cracking or puncturing of the dielectric shield will destroy the insulating qualities thereof and cause arcing and destruction thereof. Hot spots can be caused by an unequal distribution of the electric field due to variations in the spacing between the electrodes, and wide extremes of temperature of the air moving over the dielectric shield can be caused by uncontrolled air inlet temperatures and ozonation. It may be that while it has been proposed to pre-cool air to be ozonized in an ozone generating device, as for example disclosed in U.S. Pat. No. 3,024,185 to Fleck, such pre-cooling has not been commercially utilized to any significant extent because it increases the possibility of undesired temperature ranges of the air flowing over the dielectric shields. Thus, most commercial ozone generating units utilize grounded water-cooled jackets surrounding the outermost electrodes thereof which result in expensive bulky equipment which in many cases does not adequately cool portions of the ozone generating unit remote from the cooling jackets.

Ozone generating units have not been heretofore very efficiently designed. Thus, for a given ozone generating capacity, they have occupied a much greater volume of space then was often desirable. Moreover, the manner in which the electrodes and dielectric shields have been assembled have frequently been unsatisfactory from the standpoint of eliminating hot spots, and their manner of assembly has been unduly complicated and expensive. Moreover, the construction of the individual electrodes has been such as to often result in inefficient ozone generation and sparking with resultant damage to the dielectric shields, rather than an even corona discharge throughout the gap between the electrodes. Hot spots and sparking sometimes result when the electrode comprises metal projections struck from a sheet metal plate as, for example, disclosed in u.S. Pat. No. 1,010,777 to Leggett. While improvements in electrode design have been made by the utilization of wire mesh electrodes which do not have the sharp points and resulting arcing of the electrode just described, such mesh electrodes have been frequently corrugated to act as spacers between adjacent dielectric shields to form air gaps where the corona discharge and ozonization takes place. However, such a construction can create hot spots since the electrode is spaced in varying degrees from its complimentary electrode, and the air gap is somewhat encumbered by the presence of the electrode material in the space where completely free laminar air flow would be most desirable. Examples of prior art utilizing corrugated wire mesh electrodes are U.S. Pat. No. 2,155,675 to Napier and U.S. Pat. No. 1,588,976 to McBlain.

In the interest of reducing the size of the ozone generating unit, it had heretofore been proposed to arrange a number of dielectric shields in cylindrical form in concentric spaced relationship, the spacing between the tubes being effected by either corrugating the electrode or by striking therefrom tongues or the like, as for example, disclosed in U.S. Pat. No. 743,433 to Blackmore et al. However, such electrode constructions have the aforementioned disadvantages of creating hot spots and interference with the free flow of air to be ozonized through the partially obstructed spaces between the dielectric tubes. A similarly troublesome attempt at efficiently utilizing the space within an ozone generating unit is disclosed in U.S. Pat. No. 1,588,976 to McBlain, which forms a spiral roll of successive layers of dielectric and electrode-forming sheets.

Accordingly, it is one of the objects of the present invention to provide an ozone generating unit where the electric shield and electrodes are cylindrically shaped and wherein precise even spacing between the electrodes can be simply and economically achieved. A related object of the invention is to provide an ozone generating unit as just described wherein the electrodes are constructed in such a way as to produce an even corona discharge glow, whereby sparking and hot spots which damage the dielectric tubes are eliminated.

A still further object of the present invention is to provide an ozone generating unit with a number of concentrically related cylindrical dielectric tubes spaced apart in a manner which provides a minimum interference of air flow therethrough.

Another object of the invention is to provide an ozone generating unit as described which can be fabricated quickly and easily from components which may be standard components used for other purposes, to reduce manufacturing costs.

SUMMARY OF THE INVENTION

In accordance with one of the features of the present invention, the ozone generating unit includes one or more cylindrical dielectric tubes, each of which has on the inner surface thereof a cylindrical electrode made of a sheet of resilient flexible conductive material initially deformed into a given curvature different from that of the cylindrical inner surface of the associated dielectric tube, so the cylindrical electrode expands into contact with the cylindrical inner surface of the dielectric tube, thereby assuring the proper positioning of each of the electrodes. Each cylindrical electrode on the inner surface of each dielectric tube is preferably made of a straight (as distinguished from an undulating or corrugated) piece of metal mesh material. The outermost conductive electrode is most advantageously made of a rigid cylindrical electrode made of a metal mesh and friction fitted over the outermost dielectric tube.

In accordance with another feature of the invention, in the embodiment of the invention having a number of dielectric tubes, air gaps are provided between each cylindrical electrode on the inner surface of a dielectric tube and the inner surface of the adjacent dielectric tube by flexible resilient members sandwiched between the dielectric tubes. These flexible resilient members are most advantageously made of at least partially open pieces of plastic tubing which permit passage of air therethrough, to minimize interference with air flow.

In accordance with still another feature of the invention, interference to air flow into the assembly of dielectric tubes is prevented by progressively varying the lengths of the dielectric tubes, the outermost tube being longer than each tube within the same. In such case, air entering the end of the dielectric tube assembly will strike only one tube edge at a time.

Another feature of the invention provides a bundle of two or more dielectric tube and electrode assemblies like that described above which electrically interconnect at the outermost electrodes by their mutual contact and provide a large total corona discharge area in a small volume.

DESCRIPTION OF THE DRAWINGS

FIG. 4 is a fragmentary longitudinal sectional view through the air inlet end of the ozone generating unit shown;

FIG. 5 is a transverse sectional view through the air inlet end of the ozone generating unit shown in FIG. 4 taken along section line 5—5 therein;

FIG. 6 is an enlarged perspective view of one of the dielectric tube and electrode assemblies of the ozone generating unit shown in FIGS. 1 and 2;

FIG. 7 is a longitudinal sectional view through the dielectric tube and electrode assembly shown in FIG. 6;

FIG. 8 is a side elevational view of the rigid cylindrical mesh electrode which slides over the outermost dielectric tube of the tube assembly shown in FIGS. 6 and 7;

FIG. 9 shows the cylindrical mesh electrode of FIG. 8 positioned over the outermost dielectric tube of the dielectric tube and electrode assembly of FIG. 6 and 7;

FIG. 10 is an enlarged fragmentary view of the mesh electrode of FIGS. 8 and 9;

FIG. 11 is a plan view of a flexible resilient sheet of fine mesh electrode-forming material which is placed inside of one of the inner dielectric tubes and allowed to expand into contact with the inner face thereof;

FIG. 12 shows the inner dielectric tue of the ozone generating tube assembly of FIGS. 6 and 7 with the sheet of electrode-forming mesh material in FIG. 11 expanded into position along the inner surface of the dielectric tube; and FIG. 13 is an enlarged fragmentary view of the mesh electrode of FIGS. 11 and 12.

DESCRIPTION OF THE PREFERRED EMBODIMENT OF THE INVENTION

Figure 1:
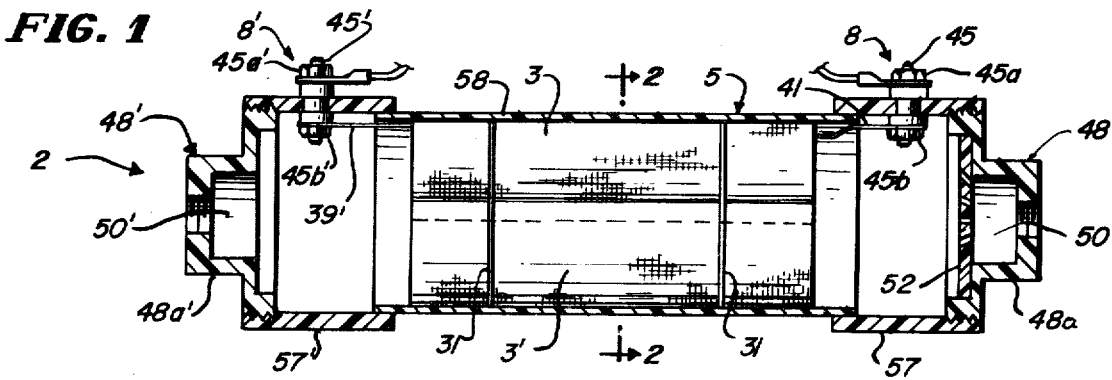
FIG. 1 is an enlarged vertical fragmentary transverse sectional view through the preferred ozone generating unit of the invention.
Figure 2:
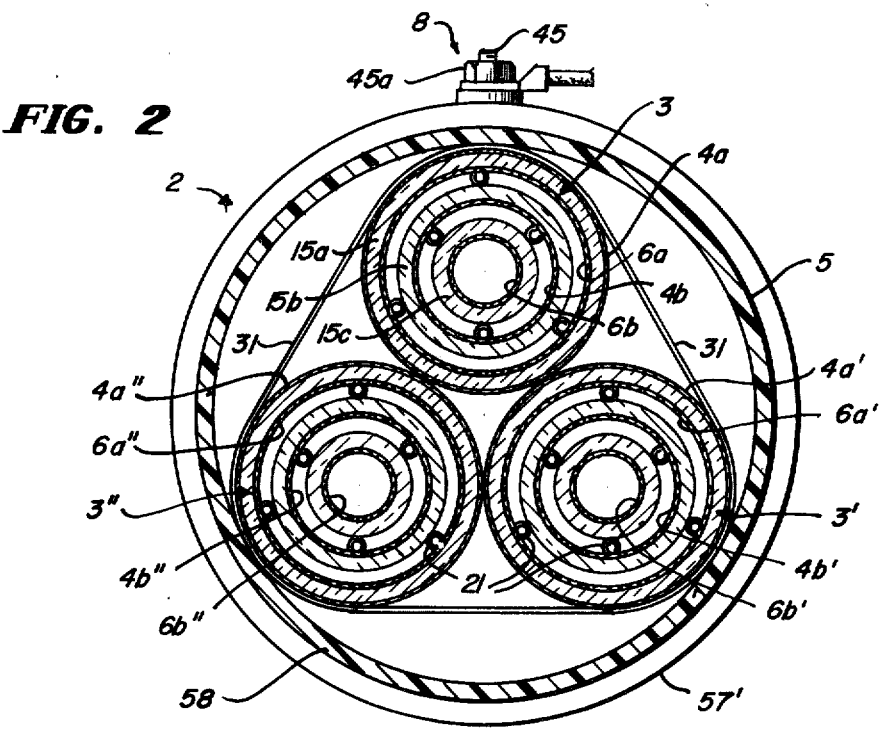
FIG. 2 is a vertical longitudinal sectional view through the ozone generating unit of the invention, taken along section line 2—2 in FIG. 1.
Figure 3:
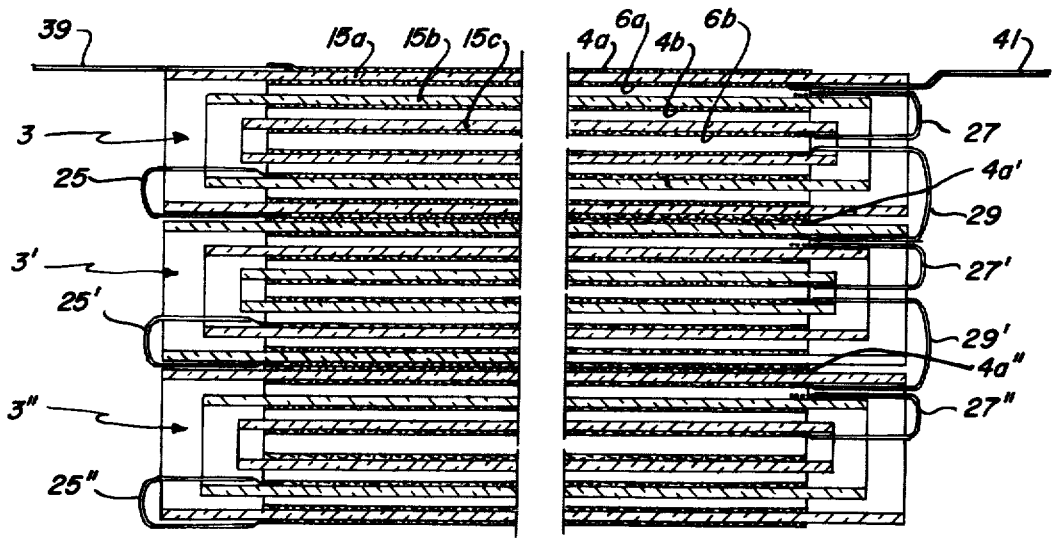
FIG. 3 is a diagrammatic view illustrating the manner in which the three ozone generating dielectric tube and electrode assemblies of the ozone generating unit of FIGS. 1 and 2 are electrically interconnected.

FIGS. 1—3 show an ozone generating unit 2 having three dielectric tube and electrode assemblies 3, 3' and 3'' banded together in a common bundle and supported within a cylindrical casing 5 made of a suitable molded insulating material like poly vinyl chloride. The dielectric tube and electrode assemblies 3, 3' and 3'' respectively have pairs of electrodes 4a–6a, 4b–6b, 4a'–6a', 4b'–6b', 4a''–6a'' and 4b''–6b'' separated by dielectric cylindrical tubes 15a–15b–15c, 15a'–15b'–15c' and 15a''–15b''–15c'' made of a dielectric material like glass. The corresponding electrodes of the various ozone generating tube assemblies in a preferred manner to be described are connected to high voltage terminals 8–8' to be connected to opposite ends of a secondary winding of a high voltage transformer (not shown). Because the ozone generating unit 2 is to be cooled by the air to be ozonized, the secondary winding of the high voltage transformer can have a grounded center tap which reduces voltages with respect to ground to one half that which would be present in the absence of such a ground, to reduce insulating requirements and the hazards of the system in comparsion to the conventional method of cooling ozone generating units incorporating in their outermost electrodes grounded water cooled jackets.

Each of the dielectric tube and electrode assemblies 3, 3' and 3'' has the construction shown in FIGS. 6 and 7 which illustrate the construction of the tube assembly 3, it being understood that the other assemblies 3' and 3'' are identical thereto. The dielectric tubes 15a, 15b and 15c thereof preferably have axial lengths progressively decreasing from the outermost to the innermost tubes, so that if air is fed into the inlet thereof, it can progressively strike only one tube at a time, which minimizes the resistance to air flow into the tubes. On the inner surfaces of the cylindrical dielectric tubes 15a, 15b and 15c, respectively, are mesh electrodes 6a, 4b and 6b of smaller mesh than the relatively rigid mesh electrode sleeve 4a supported on the outer surface of the outermost dielectric tube 15a. Each inner mesh electrode 6a, 4b and 6b may be made of a flat stainless steel mesh sized 100 × 100 or so, and of approximately 1 mm. thickness. Each electrode 4a, 6a, 4b and 6b is preferably centered with respect to and shorter than the shortest innermost cylindrical dielectric tube 15c. It is important that each mesh electrode 6a, 4b and 6b conforms uniformly to the inner surface of the associated cylindrical dielectric tube in order to avoid uneven air cooling and subsequent development of hot spots with premature insulator failure due to breakthrough of high voltage energy.

In order to accomplish this uniformity of configuration, each mesh electrode 4b, 6a and 6b is cut to exact dimensions out of a standard roll of metal mesh (see FIG. 11) and then rolled on a suitable mandril as a curve opposite to that which it had imparted to it from the standard roll of mesh and then fitted into a cylindrical dielectric tube where it expands outwardly to contact the inner surface of the cylindrical dielectric tube (see FIG. 12). The two ends of the mesh electrode are just barely in contact with each other throughout the length of the mesh electrode, which counteracts any tendency of the ends to overlap which would cause unevenness of electrode cooling at the overlap, resulting from the basic differences between the coefficients of expansion of stainless steel preferably used to make the mesh electrodes and glass preferably used to make the cylindrical dielectric tube involved. The relatively rigid outer cylindrical mesh electrode sleeve 4a is mounted snugly over the outermost cylindrical dielectric tube 15a. The outer ends of the dielectric tube 15a extends substantially beyond both ends of the mesh electrode sleeve 4a, and all the inner surfaces of the mesh electrode sleeve 4a are spaced the same distance from the inner cylindrical surface of the outer dielectric tube 15a. The rigid cylindrical mesh electrode sleeve 4a also is uniquely constructed in order to preserve uniformity of contact along the outside surface of the outermost dielectric tube 15a. This is accomplished by slightly oversizing a heavier gauge mesh electrode material on a suitable mandril and then butt welding the same along the sides that are adjacent to one another. If the resulting mesh cylinder does not slide snugly over the outermost cylindrical dielectric tube 15a, it is friction-fitted thereover by use of a strip 16 (FIG. 7) of stainless steel mesh from 5 to 25 mm. wide and about 1 mm. thick, extending the length of the sleeve and placed in the sleeve 4a before it is fitted over the cylindrical dielectric tube 15a.

In the design and construction of this tube assembly of concentrically spaced cylindrical dielectric tubes, it is mandatory that each cylindrical dielectric tube be exactly spaced and centered with respect to the other tubes. Failure to so center any cylindrical dielectric tube would result in an uneven air gap between the adjacent electrodes supported thereby, causing uneven air cooling, the development of localized hot spots, and early insulator breakdown and failure.

The spacer means for uniformly separating the cylindrical dielectric tubes most desirably do not materially interfere with air flow so as to cause uneven electrode cooling, are resistant tto oxidation by ozone so as not to lose their separating characteristics as high voltage electricity is applied to the electrodes for ozone production, possess a degree of inherent flexibility so that temperature differentials during off and on high voltage application to the electrodes which cause expansion-contraction changes in the cylindrical dielectric tubes and in the air gap between these tubes do not result in stress variations at the points of tube insulator contact with the spacer means, and are electrically non-conductive so thet they cannot serve as an electrical bridge or short circuit between high voltage electrodes of opposite polarity.

A spacer means meeting all of these requirements is oxidation resistant, flexible tubing 21 made of poly vinyl chloride and preferably having wall thicknesses of from 0.5 to 2.5 mm. and an outer diameter of from 3 to 8 mm., depending upon the air gap to be bridged. This tubing is preferably cut into lengths of from 10 to 20 mm., three such pieces being required at each end of each cylindrical dielectric tube to be centered within a larger dielectric tube. These sets of plastic tubing are carefully inserted at each end of the tube assemblies between each set of two cylindrical dielectric tubes in a manner that they fall along an equilateral spherical triangle when viewed on end.

It should be apparent that in a very simple and effective way, the construction of the tube assembly 3 described substantially perfectly spaces apart various pairs of electrodes formed by the wire mesh electrode pairs 4a–6a and 4b–6b. Also, because of the ozone generating unit construction just described, there are sufficient air gaps formed by the spacing between the dielectric tubes 15a, 15b and 15c and the wire mesh electrode pairs 6a–4b and 4b–6b, in which air gaps corona discharges are produced and through which the air to be ozonized flows. A corona discharge is also produced between the wire mesh electrodes 4a and 6b, even though these are spaced by the thickness of the outer dielectric tube 15a, which corona is located in the spaces between the wires forming the mesh of these electrodes. Air can also flow into and out of the apertures of the wire mesh electrodes 4a and 4b to be acted upon by the corona discharge produced therein. Thus, there are substantial corona discharge regions in which air circulates through the dielectric tube and electrode assembly 3 to maximize ozone generating efficiency. Also, since this air is pre-cooled, the heat generated by the ozone generating operation is readily carried away to avoid the build up of high ambient temperatures within the dielectric tube and electrode assembly 3.

The wire mesh electrodes 4a and 4b are respectively connected to the high voltage terminal 8 while the intervening wire mesh electrodes 6a and 6b are connected to the high voltage terminal 8'. The latter interconnections are effected by unique connector leads. In FIG. 6, at the left hand end of the tube assembly is shown an insulated connector lead 25 comprising a flat ribbon-like piece of aluminum or the like 25a covered by a shrink-fitted sleeve of insulation 25b, except at the very ends thereof where the exposed ends of the insulated connector leads are sandwiched between the mesh electrode 4a and the outer surface of the outermost dielectric tube 15a, and between the mesh electrode 4b and the inner surface of the intermediate dielectric tube 15b. A connecting lead 27 made of a flat ribbon 27a of metal like aluminum with a shrink-fitted sleeve of insulation 27b covering the same except at the very ends thereof is similarly sandwiched between the inner surface of the outermost dielectric tube 15a and the mesh sleeve 6a and between the inner surface of the innermost dielectric tube 15c and the mesh electrode 6b on the inner surface thereof. A similar insulated connecting lead 29 or 29' electrically interconnects the mesh electrodes 6b, 6b' or 6b'' of each tube assembly 3, 3' or 3'' with the corresponding mesh electrodes 6b, 6b' or 6b'' of one of the other tube assemblies 3, 3' or 3''. In this way, the corresponding electrodes of the various tube assemblies are interconnected together by insulated connecting leads.

The outermost wire mesh electrode-forming sleeves 4a, 4a' and 4a'' of the various tube assemblies 3, 3' and 3'' are interconnected by virtue of the contact of the electrode sleeve 4a, 4a' and 4a'' as the tube assemblies are formed into a bundle and held together by a strap 31 at each end of the bundle of dielectric tube and electrode assemblies.

A diagrammatic representation of the interconnections between the various electrodes of the tube assemblies is shown in FIG. 3.

With the construction of the tube assemblies described, there are no hot spots developed within the tube assemblies which can creat damage to the dielectric tubes, and thus in a very simple and effective manner there is provided a very compact, efficient and reliable ozone generating unit.

The bundle of tube assemblies with the strapping thereon may make a slide fit with the inner walls of the housing 5, and are held against appreciable sliding movement in the housing by relatively rigid terminal bars 39 and 41 of the dielectric tube and electrode assembly 3 which have inner ends sandwiched between the outer surface of the outermost dielectric tube 15a and the electrode sleeve 4a and outer bifurcated ends secured to projecting portions of the high voltage terminals 8 and 8' at opposite ends of the housing 5. Each terminal 8 comprises an unheaded bolt 45 or 45' extending through the end portions of housing 5 and nuts 45a–45b or 45a'–45b' threaded around the ends thereof.

As perhaps best shown in FIG. 4, the cool air enters the housing of the ozone generating unit 2 through a cup-shaped end wall portion 48 at one end of the housing 5. The end wall portion 48 has a cylindrical side wall portion 48a defining a cylindrical cavity 50 therein which opens onto the interior of the housing. This opening is covered by a perforated plate 52 having apertures 54 which incline outwardly in progressively greater degrees proceeding radially outwardly from the center thereof and from the inside face to the outside face thereof. Thus, air flowing into the cavity 50 passes through the plate 52 to create air streams fanning out at various angles encompassing the entire cross sectional area of the housing 5 so that the air readily flows through all of the axially extending spaces present within the tube assemblies 3, 3' and 3'' in the housing 5.

The cup-shaped end wall portion 48 terminates in a rearwardly outwardly radially extending flange 56 which defines an inwardly facing shoulder 56a against which the circular plate 52 is adhesively or otherwise secured. The flange 56 of the housing end portion 48 is secured to a larger cylindrical end cap portion 57 which is adhesively secured to the outer portion of a cylindrical main body portion 58 of the housing 5. The main body portion 58 of the housing 5 contains the bundle of tube assemblies previously described. At the opposite end of the main body portion 58 of the housing 5 there is an end cap portion 57' (see FIG. 1) and end wall portion 48' corresponding to the portions 57 and 48 just described. The terminals 8 and 8' are mounted upon the end cap portions 57 and 57' of the housing 5 in the manner previously described.

While the dimensions of the various parts of the ozone generating unit may vary widely in the exemplary form of the invention being described, the thickness of dielectric tubes 15a, 15b and 15c were 1.8 mm. + or − 0.2 mm., the air gap between each inner electrode and outer surface of the adjacent dielectric tube was between about 0.8 to 1.2 mm. and the voltage applied across the electrodes was about 12,000 volts.

It should be apparent that the present ozone generating unit results in an exceedingly reliable, compact and efficient ozone generating unit which is easy to assemble.

It should be understood that numerous modifications may be made in the most preferred form of the invention described without deviating from the broader aspects of the present invention.

We claim:

1. In an ozone generating unit including an enclosure forming a passageway for the flow of an oxygen containing gas to be ozonized, a first dielectric tube in said passageway which first tube has an electrode receiving portion with a substantially even thickness and a cylindrical inner surface, an outer cylindrical conductive electrode concentrically mounted on the ouside of and spaced from said electrode receiving portion of said dielectric tube to provide an air gap therebetween, an inner cylindrical electrode on the inside of the electrode receiving portion of said dielectric tube, and a pair of high voltage connecting terminals electrically connected respectively to said electrodes, there being provided between said outer and inner electrodes an air gap where an ozone producing corona is produced upon connection of a high voltage to said terminals, the improvement wherein said inner electrode is made of a sheet of resilient flexible conductive material of a width of about but no greater than the inside circumference of the interior surface of said electrode receiving portion of said dielectric tube and expanding into even continuous contact with the cylindrical inner surface of said dielectric tube so the ends of said resilient flexible sheet of conductive material forming said inner electrode are in even contiguous confronting relation, to provide an even spacing between said electrodes.

2. The ozone generating unit of claim 1 wherein said cylindrical electrode on the inner surface of said dielectric tube is made of a flat metal mesh sheet material.

3. The ozone generating unit of claim 1 wherein there is a second dielectric tube of substantially even thickness immediately surrounding in concentric spaced relationship said first mentioned dielectric tube which second tube has an electrode receiving portion with a substantially even thickness and a cylindrical inner surface, said outer conductive electrode being made of a sheet of resilient flexible conductive material of a width of about but no greater than the inside circumference of the interior surface of the electrode receiving portion of said latter dielectric tube and expanding into even continuous contact with the cylindrical inner surface of the latter tube so the ends of said resilient flexible sheet of conductive meterial forming said inner electrode are in even contiguous confronting relation, there being an even air gap between the outermost surface of the first mentioned dielectric tube and the electrode on the inner surface of said second dielectric tube.

4. The ozone generating unit of claim 3 wherein each of the electrodes on the inside surface of each dielectric tube is made of a flat metal mesh sheet material.

5. The ozone generating unit of claim 1 wherein said outer cylindrical metal electrode is a substantially perfectly cylindrical rigid metal mesh body friction fitted over the cylindrical outer surface of said cylindrical dielectric tube.

6. An ozone generating unit comprising: an enclosure forming a passageway for the flow of an oxygen containing gas to be ozonized, an assembly of concentric dielectric tubes in said passageway spaced from one another to provide for gas flow through the spaces between the dielectric tubes, the end of said dielectric tube assembly into which the gas to be ozonized flows terminating at different points located progressively axially inwardly of the dielectric tube assembly proceeding from the outermost to the innermost dielectric tubes, so the oxygen containing gas can progressively strike only one tube edge at a time to minimize resistance to gas flow into the dielectric tube assembly, a pair of metal electrodes on opposite sides of each dielectric tube, and a pair of high voltage connecting terminals respectively electrically connected to said pairs of electrodes.

7. An ozone generating unit comprising: an enclosure forming a passageway for the flow of an oxygen containing gas to be ozonized, an assembly of at least three cylindrical concentric dielectric tubes in said passageway spaced from one another to provide gas flow through the spaces between the dielectric tubes, an outer cylindrical conductive electrode on the outside of the outermost dielectric tube, an electrode on the inner surface of each of said dielectric tubes, each of the latter electrodes being made of a sheet of conductive material of a width of about but no greater than the circumference of the interior surface of the associated dielectric tube and being initially deformed into a given shape different from that of the cylindrical inner surface of said associated dielectric tube so that each of the latter electrodes expands into even continuous contact with the cylindrical inner surface of said associated dielectric tube so that the ends of said resilient flexible sheet of conductive material forming said inner electrodes are in even contiguous confronting relation, a pair of high voltage connecting terminals, there being provided between each adjacent pair of dielectric tubes a corona discharge air gap region where an ozone producing corona is produced; electrical connecting means electrically connecting one of said high voltage terminals to said outer electrode and every alternate electrode mounted on the inner surface of a dielectric tube within said outermost dielectric tube, and electrically connecting means electrically connecting the other high voltage connecting terminal to the electrode on the inner surface of said outermost dielectric tube and every alternate dielectric tube mounted on the inner surface of a dielectric tube within said outermost dielectric tube.

8. The ozone generating unit of claim 7 wherein said dielectric tubes are centered by circumferentially spaced sections of at least partially open flexible resilient tubing compressively sandwiched between the dielectric tubes at the opposite ends of the dielectric tube assembly whereby gas flows through the tubing.

9. In an ozone generating unit including an enclosure forming a pssageway for the flow of an oxygen containing gas to be ozonized, an assembly of concentric dielectric tubes in said passageway spaced from one another to provide for gas flow through the spaces between the dielectric tubes, which spaces include at least one gap in which ozone producing corona discharge is to be produced between electrode receiving portions of adjacent dielectric tubes, and cylindrical electrodes concentrically disposed on opposite sides of said dielectric tubes, the improvement wherein said dielectric tubes are held in centered spaced relation by circumferentially spaced open-ended tubular flexible resilient members sandwiched in partial compression between the dielectric tubes at the opposite ends of the dielectric tube assembly so gas can flow therethrough.

10. The ozone generating unit of claim 9, wherein each of said flexible resilient spacer members extends only a small fraction of the length of the associated dielectric tubes and are located axially outwardly of said metal electrodes so they are removed from the corona discharge region of the unit.

11. The ozone generating unit of claim 9 wherein there are only three substantially equally circumferentially spaced flexible resilient spacer members at each end of said dielectric tube assembly.

* * * * *